United States Patent Office 3,122,062
Patented Feb. 25, 1964

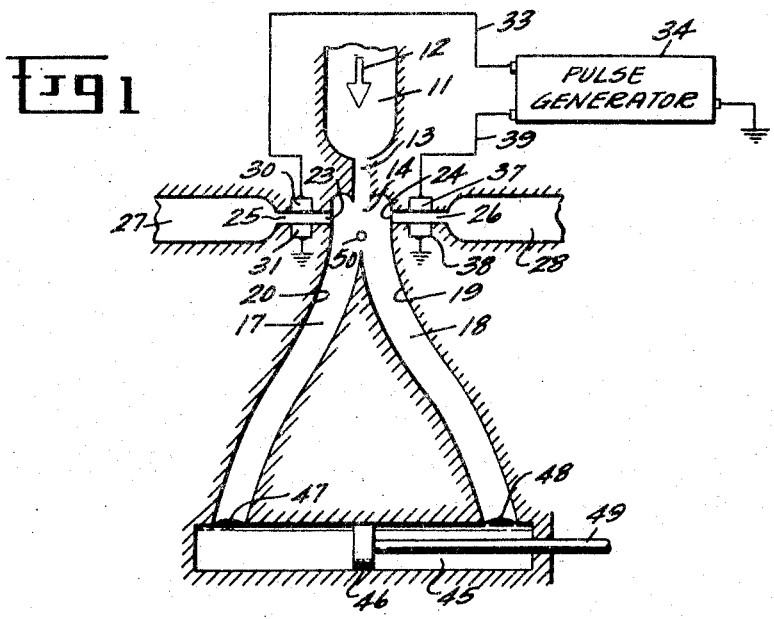
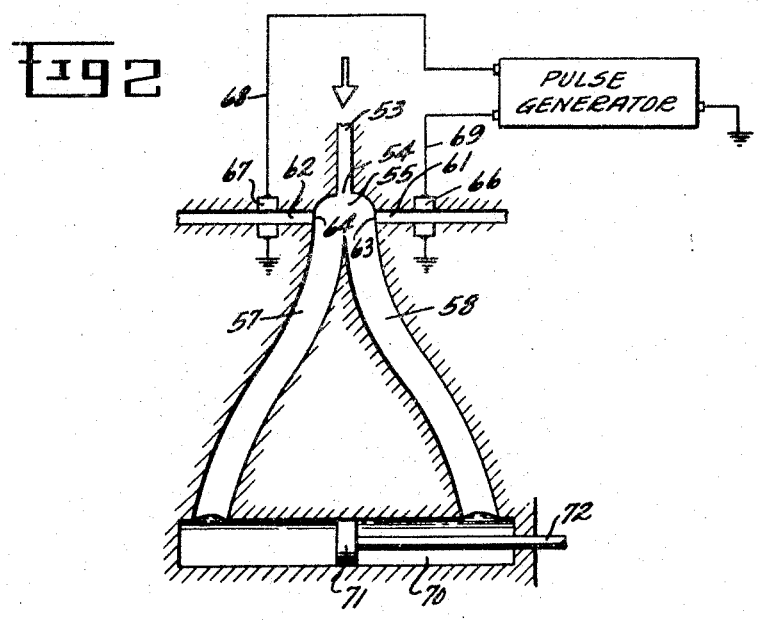

3,122,062
ARC DISCHARGE CONTROLLED FLUID
AMPLIFIER
Alvin L. Spivak, Narberth, Pa., and Jack A. Russell, Muskegon, Mich., assignors to General Electric Company, a corporation of New York
Filed Jan. 23, 1962, Ser. No. 168,190
6 Claims. (Cl. 91—3)

The present invention relates to a fluid valve or amplifier of the type which controls fluid flow by use of small control fluid flows acting to react with the main fluid stream, and in particular to a fluid amplifier utilizing an arc discharge means to control the control fluid flow.

Fluid amplifiers of the type utilizing a side control jet to deflect a main fluid flow into one of several branch passages are well known in the art. In this type of device a main flow passageway is connected to a juncture from which branch passageways lead off. At the point where the main flow enters the juncture, side ports for passage of control fluid flow normal to the main flow are provided which, by selectively allowing such control fluid to flow, will control the main flow by deflecting it into the desired branch passage. These devices are therefore referred to as fluid amplifiers because of the fact that a small control fluid flow may be utilized to control the flow of a large fluid stream.

Naturally an advantage of such control devices is the fact that the momentum of the primary flow stream is preserved and any pressure drop across the device is quite small. In addition, such devices may be made to be bi-stable, that is once the primary stream is deflected to flow through a branch stream, the boundary layer effect between this stream and the flow passage walls will tend to lock the primary stream to flow in this direction. However, such devices do require that control means be provided for the control fluid flow which may involve moving parts with the usual sealing problems, or some other device involving a transducer to control this flow. Naturally, if such a control involves mechanical assemblies or other complicated means, the overall advantages of using such a fluid amplifier diminish.

It is therefore one object of this invention to provide a novel fluid amplifier, utilizing no moving parts.

It is another object of this invention to provide such a fluid amplifier wherein control fluid flow is controlled by arc discharge means.

In accordance with one preferred embodiment of the invention, there is provided a fluid amplifier having a fluid supply passage leading to a juncture from which branch passages lead. Control ports are provided adjacent said supply passage at said juncture for control fluid flow to or from said passage, for deflecting the primary stream into one of the branch passages. Means for controlling this control fluid flow includes an arc discharge device positioned to discharge an arc so as to cause the control fluid to pulse and thereby deflect the primary flow into the desired branch passage.

Other objects and many of the attendant advantages of this invention will be readily appreciated as the same becomes better understood by reference to the following description when considered in connection with the accompanying drawings, wherein:

FIG. 1 is a diagrammatic illustration of a fluid amplifier employing arc discharge means to control the flow of control fluid; and FIG. 2 is a diagrammatic illustration of another embodiment of the fluid amplifier wherein the control fluid flows outward from the fluid amplifier and is controlled by arc discharge means.

Referring now to the drawings, in FIG. 1 is illustrated diagrammatically the fluid amplifier including an inlet passage 11 through which the controlled or main fluid flow flows in the direction of the arrow 12 through a restricted area 13 into a cavity or juncture 14. Connected to this juncture are two branch passages 17 and 18 which receive the flow in a manner such that the main flow may pass through the cavity and flow into either of the branch passages with practically no loss in momentum. These branch passages are also so constructed such that when the flow is deflected say through passage 18 the boundary layer forces caused by the interaction of the moving fluid and the outside wall 19 will tend to hold the flow through this branch passage with no additional forces acting on the main flow. Similarly, the flow through passage 17, once so directed, will be held by the boundary layer forces acting on the main flow caused by the interaction of the main flow with the wall 20. It can be seen by this that a bi-stable valve or fluid amplifier is provided, however while the invention is herein described in connection with a bi-stable valve, it is equally applicable to uni-stable valves; also if more branch passages are desired, these branch passages need only to be divided again by an additional valve of the type described or the branch passages could be located in an annular configuration wherein the locus of the deflected main flow would describe a cone. The same boundary layer effect could be utilized to provide a multi-stable valve.

Turning now to the means for deflecting the main flow to initially cause its passage through one of the branch passages, there are provided in this embodiment ports 23 and 24 on either side of the juncture 14. Connected to these ports are conduits 25 and 26 respectively which form restricted passages for the passage of control fluid leading from the control fluid supply passages 27 and 28.

It may be seen that by allowing for fluid flow from passage 27 through the restriction 25 in the port 23 into the juncture 14 to intersect the main flow 12 with sufficient velocity, by vector addition it may be seen that the main flow will be deflected to flow into the branch passage 18 and against the wall 19 therein. As mentioned previously, the valve is bi-stable, that is by proper configuration of the wall 19 this main flow through the branch passage 18 will continue even after the control fluid flow through the port 23 is stopped. This flow will continue until such conditions are changed. Factors which may affect the flow are a reduction of the back pressure of the system, the main flow 12 is reduced in pressure or control fluid flow is introduced through the passage 28 and the restriction 26 to the port 24 with sufficient force to divert the flow over to the branch passage 17 in the same manner as heretofore described. It should be remembered that some flow may continue at all times through both ports 23 and 24 so long as this flow is not sufficient to affect the previously determined direction of flow of the main fluid flow 12. Therefore valves need not be provided for stopping the flow altogether, but the flow need only be accelerated to affect the stable condition of the main flow.

In order to accelerate the flow of the fluid through the control ports to effect a deflection of the main flow 12 as mentioned heretofore, there are located in the restricted passage 25 electrodes 30 and 31 with electrode 31 connected to a conductor leading to ground and electrode 30 connected through conductor 33 leading to a source of voltage, in this instance a pulse generator 34. Similarly, restricted control fluid passage 26 incorporates electrodes 37 and 38 with electrode 38 connected to ground and electrode 37 connected through the electrical conductor 39 to a source of voltage, in this instance also the pulse generator 34.

These electrodes are located on opposite sides of the restricted passage and are exposed to the fluid flowing through the passage in a manner such that when a voltage potential is impressed between the electrodes of sufficient magnitude, an arc will be discharged across the restricted passages and through the electrode 38 to ground. As pointed out before, a certain flow may be allowed through both ports 23 and 24 which may be of such low pressure as to not deflect the primary flow from the already stable condition of flowing either through the branch passage 17 or 18. It is therefore desirous to pulse this flow in some manner without the use of a mechanical assembly or other such devices which would reduce the reliability or increase the sealing problems of the valving device.

As one aspect of this invention, it has been found that by allowing the arc discharge mechanism consisting of a source of voltage 34 acting through electrical conductors 33 and 39 and electrodes 30 and 37 to discharge an arc across the flow passageway to electrodes 31 and 38 to ground, a sudden burst or pulse of fluid is caused to flow selectively through the restricted passages 25 and 26 and out the ports 23 and 24 because a high pressure and temperature region is created in said control fluid flow by the arc. This pulse may be sufficient to deflect the main fluid stream which is flowing from the supply passage 11 through the cavity 14 into the branch passage 17 or 18. The pulse generator includes a switching device which determines whether the discharge pulse passes through the conductor 33 or 39 and thereby controls which branch passage the main fluid stream flows through by controlling the control fluid flow which is pulsed.

It has been found that the pulse source may vary in voltage output as the fluid passing through the control ports is changed. Where air was used as the control fluid, the discharge pulse from a 5 microfarad capacitor at 2,000 volts was found satisfactory for providing the necessary pulse to switch the flow of the main flow stream. Where argon and neon gases were used as the control flow, a 500 volt arc discharge was sufficient. In addition to the other important aspects of the invention, another important advantage of this invention is quick response. Since there are no moving parts utilized, inertia is not a limiting factor in determining the rate of switching and 400 cycles per second is a satisfactory switching rate for such an arc discharge controlled fluid amplifier.

The quick response of the fluid amplifier becomes extremely important in such applications as controlling the positioning of a reciprocating cylinder. In this application of the invention, as illustrated in FIG. 1, the branch passages 17 and 18 are connected to opposite ends of a cylinder 45 containing a reciprocating type piston 46 which it is desired to both position correctly and hold stationary. In positioning the cylinder, the main flow is caused to alternately flow through branch passages 17 and 18 and cylinder inlets 47 and 48 respectively in a proportioned manner to position the piston longitudinally within the cylinder. A rod 49 may be attached to the piston to allow the positioning of the piston to be monitored. With the use of the subject arc discharge control where high frequency switching is possible, the piston is held stationary once positioned by the fast and closely controlled proportioned flow through the branch passages. An opening or discharge outlet 50 may be provided at the juncture 14 to vent the expelled fluid from the low pressure side of the cylinder and further add to the quick response of the controlled piston.

FIG. 2 illustrates a second embodiment of the invention wherein the main flow 53 being controlled passes through the inlet passage 54 to the juncture 55. Branch passages 57 and 58 lead from the juncture at a position at which the main flow may be deflected to flow therethrough thereby providing a bi-stable fluid amplifier. Control fluid conduits 61 and 62 are provided connected through ports 63 and 64 to the juncture 55 with the opposite end open to atmosphere. In the manner of FIG. 1 pairs of electrodes 66 and 67 are provided in the walls of the control fluid conduits to momentarily pulse the fluid flowing through these conduits. These electrodes are connected through electrical conductors 68 and 69 to a pulse generator.

Connected to branch passages 57 and 58 is a cylinder 70 or some similar load device which it is desired to control. In the cylinder 70 is a piston 71 connected to a shaft 72 so that as the piston reciprocates through the cylinder 70, the shaft is driven in the same manner. When the main flow 53 is introduced through the passage 54 to flow through one of the branch passages, say 58, the flow will tend to continue to flow through this passage because of the boundary layer forces between the flow and the passage 58. At the same time elevated fluid pressure within the juncture 55 of the valve will cause a small amount of the main flow to enter the port 63 and flow outward through the conduit 61 to create such a boundary layer force by effecting a lower fluid pressure in the juncture 55 adjacent the port 63.

By the main flow through branch passage 58 the piston 71 will be moved to the left because of the force exerted by this flow on one face of the piston. This movement causes fluid to the left of the piston 71 in the cylinder 70 to be expelled up through the branch passage 57 and subsequently out the port 64 and control fluid conduit 62. These steady state conditions will remain until the flow through the conduit 61 is interrupted or otherwise affected sufficiently to overcome the boundary layer forces in branch passage 58. To effect this change an electrical pulse is discharged between the electrodes 66 which will cause a high pressure and temperature region in said flow to interrupt the steady state flow condition sufficiently to cause this control fluid flow to react with said main flow and overcome and interrupt these boundary layer forces and cause the main flow to switch to the branch passage 57. At this time the flow through the branch passage 57 will move the piston 71 to the right thereby expelling fluid through branch passage 58 to port 63 and out through the conduit 61. By this embodiment no secondary flow through the control fluid conduits need be provided, however all the further advantages of the arc discharge control are realized as in the FIG. 1 embodiment.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A fluid valve comprising the combination of a first passage for carrying a main fluid flow,
   a plurality of branch passages leading from said first passage at one juncture and positioned at said juncture to receive said main fluid flow,
   a control fluid port for each branch passage positioned to carry a control fluid flow normal to said main flow which reacts on said main flow to cause it to flow into said branch passages,
   means to control said control fluid flow,
   said means comprising a pair of electrodes exposed to said control fluid flow and positioned on opposite sides of said flow such that the discharge of an electrical arc between said electrodes will cause an instantaneous high pressure and temperature region in said control fluid to cause said control fluid to react with and deflect said main fluid flow.

2. A fluid valve comprising,
   a main flow inlet for carrying a main flow to be controlled,
   a plurality of branch outlets positioned at a common juncture with said main flow to receive said main flow,
   a control fluid port for each branch outlet positioned such that a flow of control fluid through said port under sufficient pressure will intercept and react with said main flow to divert it into that branch outlet, means to supply control fluid to each of said control fluid ports simultaneously at a pressure below that necessary to divert said main flow, means to instantaneously increase the pressure of the control fluid flow through a desired port, said means comprising a pair of electrodes positioned adjacent said port on opposite sides of said control fluid flow and exposed to said flow to allow an electrical arc to be discharged across said control fluid flow, whereby such arc discharge causes an instantaneous pressure and temperature rise in said control fluid flow sufficient to react with said main flow and divert it into the associated branch passage.

3. A fluid valve comprising a juncture, a main flow inlet connected to carry a main fluid flow to said juncture, a pair of branch passages leading to said juncture and positioned to receive said main fluid flow, a control fluid port positioned adjacent each branch passage to receive and carry off a small amount of said main flow when said main flow is passing through that branch passage and thus create boundary layer forces to hold said main flow in that branch passage, means to modify said control fluid flow to effect a reaction between this flow and said main flow and interrupt said boundary layer forces and cause said main flow to divert to another branch passage.

said means comprising an arc discharge device having a pair of electrodes positioned on opposite sides of said control fluid flow and exposed to said flow whereby the discharge of an arc between said electrodes an instantaneous high pressure and temperature region is effected in said control fluid to affect said flow and cause it to react with said main flow.

4. A fluid valve comprising the combination of a first passage for carrying a main fluid flow, a plurality of branch passages leading from said first passage at a common juncture and positioned to receive said main flow individually, a plurality of control fluid ports positioned to carry a control fluid flow normal to said main flow which reacts on said main flow to cause it to flow into one of said branch passages, means to control said control fluid flow, said means comprising a pair of electrodes exposed to said control fluid flow and positioned on opposite sides of said flow such that the discharge of an electrical arc between said electrodes will cause an instantaneous high pressure and temperature region in said control fluid flow to cause said main fluid flow to deflect into a desired branch passage, a load device connected to said branch passages to be driven by the main flow passing through one branch passage, with the remaining branch passages returning expelled fluid to said juncture from said load device, and a discharge outlet at said juncture to receive said expelled fluid and vent it from the valve.

5. A fluid valve comprising the combination of a first passage for carrying a main fluid flow, a plurality of branch passages leading from said first passage at one juncture and positioned to receive said main fluid flow individually, a plurality of control fluid ports positioned to carry a control fluid flow normal to said main flow which reacts on said main flow to cause it to flow into one of said branch passages, means to control said control fluid flow, said means comprising a pair of electrodes exposed to said control fluid flow and positioned on opposite sides of said flow such that the discharge of an electrical arc between said electrodes will cause an instantaneous high pressure and temperature region in said control fluid to cause said main fluid flow to deflect into a desired branch passage, a load device connected to said branch passages to be driven by the main flow passing through one branch passage, with the remaining branch passages returning expelled fluid to said juncture from said load device, with said control fluid ports at said juncture receiving said expelled fluid to vent it from the valve.

6. A fluid valve comprising the combination of a first passage for carrying a main fluid flow, a plurality of branch passages leading from said first passage at a common juncture and positioned to receive said main fluid flow, a plurality of control fluid ports positioned to carry a control fluid flow normal to said main flow which may react with said main flow to cause it to flow into selected branch passages, and electrical arc discharge means positioned to discharge an electrical arc to act on said control fluid flow to cause it to react with said main fluid flow.

References Cited in the file of this patent

UNITED STATES PATENTS

| 2,782,863 | Christy et al. | Feb. 26, 1957 |
| 3,001,539 | Hurvitz | Sept. 26, 1961 |
| 3,001,698 | Warren | Sept. 26, 1961 |
| 3,016,066 | Warren | Jan. 9, 1962 |

OTHER REFERENCES

Science & Mechanics magazine; published by B. G. Davis, Chicago, Illinois; volume 31, No. 3; June 1960; page 83.